United States Patent [19]

Suzuki et al.

[11] Patent Number: 4,652,479
[45] Date of Patent: Mar. 24, 1987

[54] MAGNETIC RECORDING MEDIUM

[75] Inventors: Toshiyuki Suzuki; Reiji Nishikawa, both of Yokohama, Japan

[73] Assignee: Kabushiki Kaisha Toshiba, Kawasaki, Japan

[21] Appl. No.: 708,642

[22] Filed: Mar. 6, 1985

[30] Foreign Application Priority Data

Mar. 9, 1984 [JP] Japan .................................. 59-45207

[51] Int. Cl.⁴ .............................................. G11B 5/62
[52] U.S. Cl. ...................................... 428/64; 478/212; 478/215; 478/216; 478/457; 478/694; 478/900
[58] Field of Search ............... 428/215, 216, 694, 212, 428/64, 900, 457; 360/131, 135

[56] References Cited

U.S. PATENT DOCUMENTS 4,323,621 4/1982 Kober et al. ........................ 428/216
4,410,583 10/1983 Hanaoka ............................ 428/216

FOREIGN PATENT DOCUMENTS 1530911 11/1978 United Kingdom ................ 428/216

Primary Examiner—George F. Lesmes
Assistant Examiner—William M. Atkinson
Attorney, Agent, or Firm—Oblon, Fisher, Spivak, McClelland & Maier

[57] ABSTRACT

In a magnetic recording disk of a double-sided data recording type according to a perpendicular magnetic recording technique of the invention, recording layers having different film thicknesses are formed on two surfaces of a base layer. The film thickness of one magnetic recording layer is set to be larger than the film thickness of the other magnetic recording layer, thereby preventing a curl phenomenon. In addition, a coercive force of the thicker recording layer is set to be smaller than that of the thinner layer. Thus, differences in a reproduction output voltage and an optimal recording current between the two recording layers of the disk due to a film thickness difference can be compensated for.

3 Claims, 6 Drawing Figures

F I G. 1
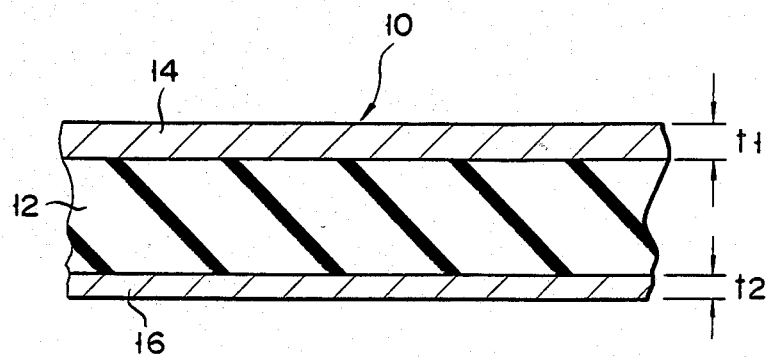
F I G. 2
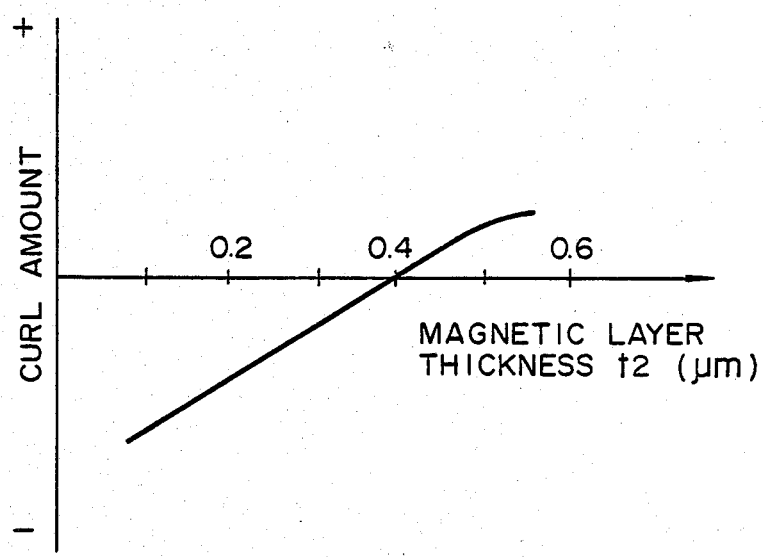

F I G. 3
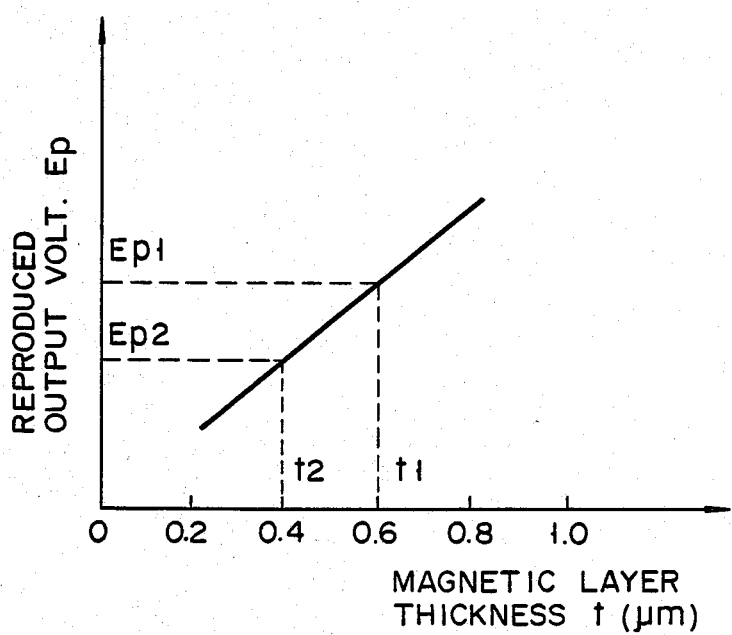
F I G. 4
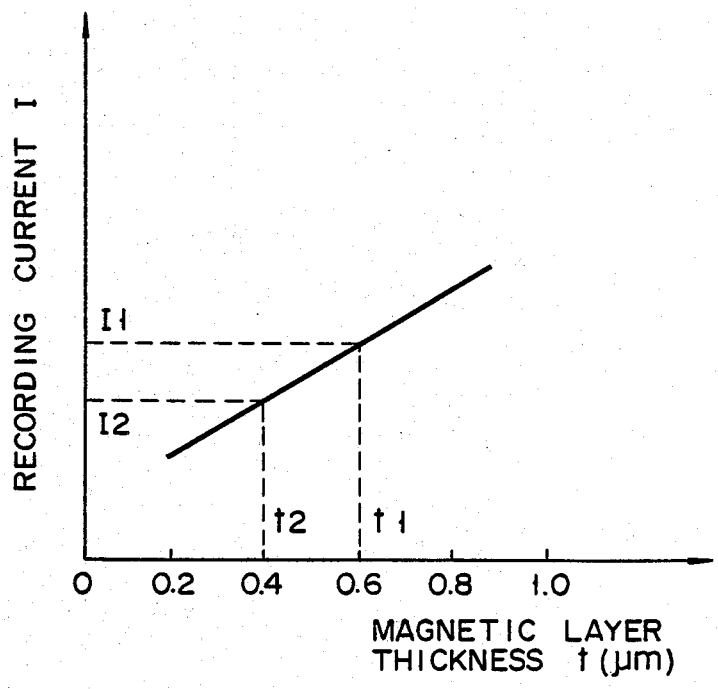

MAGNETIC RECORDING MEDIUM

BACKGROUND OF THE INVENTION

1. Field of the Invention

The present invention relates generally to a perpendicular magnetic recording technique and, more particularly, to a perpendicular magnetic recording medium having recording layers formed on two surfaces of a substrate.

2. Discussion of Background

Recently, a perpendicular magnetic recording technique has been studied as a new technique which replaces a conventional magnetic recording technique. According to this technique, residual magnetization is formed in a direction substantially perpendicular to a film surface of a magnetic recording layer of a recording medium, thus realizing high-density magnetic storage of data.

A disk-shaped magnetic recording medium which can record/reproduce data on/from two surfaces thereof is preferably used as a recording medium in the perpendicular magnetic recording technique. This disk-shaped magnetic recording medium is known to persons skilled in the art as a "double-sided recording type disk" or a "double-sided diskette". According to the recording disk of this type, first and second magnetic recording films are formed on two surfaces, respectively, of a disk-shaped substrate formed of, e.g., a flexible base layer of a plastic material or the like. These magnetic recording films have an axis of easy magnetization in a direction perpendicular to their surfaces and are, e.g., cobalt-chromium (Co-Cr) films. When a changing magnetic field corresponding to recording data is applied to either of the Co-Cr films by a magnetic head, residual magnetization is formed in correspondence with the magnetic field strength so as to be perpendicular to the film surface, thereby recording data.

When a perpendicular magnetic recording disk as described above is manufactured, Co-Cr magnetic films are generally formed on a substrate or base layer by sputtering or deposition. Since the magnetic films must be formed on two surfaces of the base layer, it is difficult to match physical characteristics of the two magnetic films in this manufacturing process. If waving of the film, i.e., a so-called "curl" phenomenon (this phenomenon is considered to easily occur when a double-sided disk is manufactured) occurs, an intimate contact movement of the magnetic head to the surface of the magnetic film (i.e., uniform head touch) cannot be obtained. The recording head touch onto the surface of the magnetic film is very important for the perpendicular magnetic recording technique with high recording density. The "curl phenomenon" prevents a coincidence between the characteristics of two magnetic films or recording films (i.e., noncoincidence or nonuniformity of the recording current or reproduced output between two magnetic films undesirably occurs). This renders the manufacture of a perpendicular magnetic recording medium more difficult.

SUMMARY OF THE INVENTION

It is therefore an object of the present invention to provide a new and improved magnetic recording medium which can prevent a curl phenomenon which is caused when magnetic recording layers are formed on two surfaces of a flexible substrate for perpendicular magnetic recording, and in which the magnetic recording layers have the same optimum recording current and reproduced output voltage.

A magnetic recording medium according to the perpendicular magnetic recording technique of the present invention is of a double-sided data recording type. According to this magnetic recording medium, recording layers having different film thicknesses are formed on two surfaces of a base layer. In other words, when first and second magnetic recording layers are formed on two surfaces of the base layer, the first magnetic recording layer is thicker than the second magnetic recording layer. The first magnetic recording layer is designed to have a lower coercive force than that of the second magnetic recording layer. A curl phenomenon is prevented when the first and second magnetic recording layers have different thicknesses. In order to compensate for a difference in a reproduced output voltage and an optimum recording current between the two recording layers due to the difference between the film thicknesses thereof, the coercive force of the thicker recording layer is set to be smaller than that of the thinner recording layer.

BRIEF DESCRIPTION OF THE DRAWINGS

The present invention is best understood by reference to the accompanying drawings, in which:

FIG. 1 is a sectional view showing a structure of a magnetic recording disk which can record data in two surfaces thereof according to a perpendicular magnetic recording technique of an embodiment of the present invention;

FIG. 2 is a graph showing changes in a curl amount of the magnetic recording disk with respect to changes in film thickness of two recording layers thereof;

FIGS. 3 and 4 are graphs showing changes in a reproduced output and an optimal recording current with respect to film thicknesses of two recording layers of the magnetic recording disk.

DETAILED DESCRIPTION OF THE PREFERRED EMBODIMENT

Figure 5:
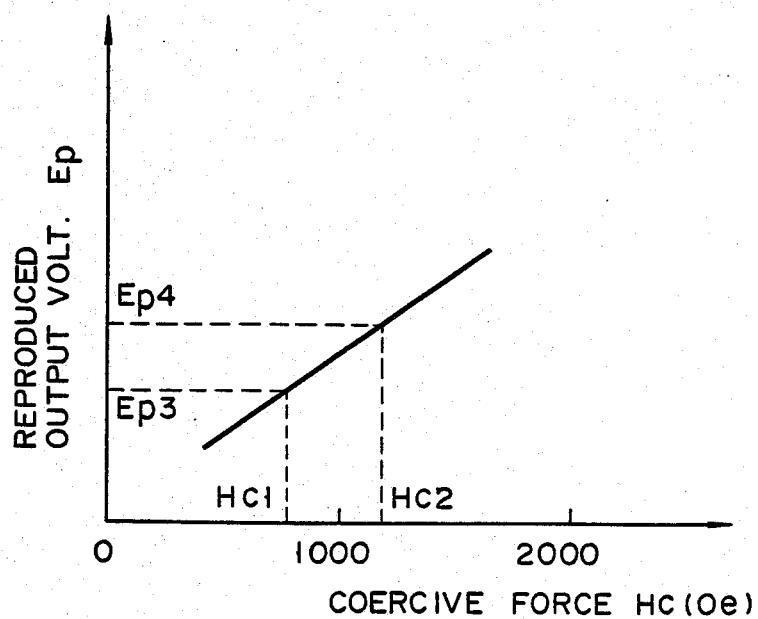
FIGS. 5 and 6 are graphs respectively showing changes in a reproduced output and an optimal recording current with respect to a change in a coercive force perpendicular to the recording layer of the magnetic recording disk.

FIG. 1 is a sectional view showing a structure of a magnetic recording disk 10 based upon a perpendicular magnetic recording technique of one preferred embodiment of the present invention. A flexible substrate (or base layer) 12 is formed of a polymeric plastic material in a disk-shape. First and second magnetic recording layers 14 and 16 are formed on two surfaces of the disk-shaped substrate 12. These recording layers 14 and 16 have an axis of easy magnetization substantially perpendicular to the film surfaces thereof, thereby allowing the recording/reproduction (or writing/reading) of data in accordance with the perpendicular magnetic recording technique. The disk with a structure shown in FIG. 1 is a so-called "double-sided recording type disk". In this embodiment, the recording layers 14 and 16 are cobalt-chromium (Co-Cr) films formed by sputtering.

According to the recording disk 10 for perpendicular magnetic recording illustrated in FIG. 1, the first and second recording layers 14 and 16 have different film thicknesses t1 and t2. In this case, the film thickness t1 of the first recording layer 14 is larger than the thickness t2 of the second recording layer 16. A perpendicular coercive force Hc1 of the first recording layer 14 is lower than a perpendicular coercive force Hc2 of the second recording layer 16. These conditions are important technical features of the present invention.

A difference between the respective film thicknesses t1 and t2 of both the Co-Cr recording layers 14 and 16 can suppress or prevent the "curl phenomenon" which easily occurs when the recording layers 14 and 16 are formed on two surfaces of the substrate 10 and which degrades the intimate contact of the recording head. FIG. 2 is a graph showing changes in the curl amount when a ratio of the thicknesses t1 and t2 of the two recording layers 14 and 16 of the recording disk 10 is changed. Note that this graph contains actual measurements obtained by the present inventors. When the thickness of one layer, e.g., the thickness t1 of the first recording layer 14 was fixed at a constant value of 0.6 μm and the thickness of the other layer, e.g., the thickness t2 of the second recording layer 16 was varied within the range between 0.1 μm and 0.6 μm, the curl amount changed in a substantially linear manner. When the thickness t1 of the recording layer 14 was 0.6 μm and the thickness t2 of the recording layer 16 was 0.4 μm, the curl amount in the magnetic recording disk 10 was zero. In other words, when a ratio ($=t2/t1$) of the thicknesses t2 and t1 of the two recording layers 16 and 14 was 0.67, the curl amount in the magnetic recording disk 10 was zero. Therefore, when the thicknesses t1 and t2 of the two recording layers 14 and 16 of the disk 10 differ from each other and the ratio thereof is properly set, the curl amount occurring in the double-sided recording type magnetic disk 10 in the manufacturing process can ideally be zero, i.e., can be prevented.

However, the difference in thickness of the two recording layers 14 and 16 undesirably causes a difference in characteristics of a reproduced output voltage (i.e., a voltage generated when the same data is magnetically read from the recording layer) versus an optimum recording current (i.e., a current required for magnetically writing the data in the recording layer) thereof. In the double-sided recording type disk 10, the characteristics of the reproduction output voltage vs. the optimum recording current of the two surfaces are preferably the same. With respect to system design, it is undesirable to have different characteristics of the reproduced output voltage vs. the optimum recording current of the two recording layers 14 and 16. Noncoincidence or nonuniformity between the reproduced output voltages of the two recording layers 14 and 16 is caused by an increase in a reproduced output voltage Ep which is proportional to an increase in the film thickness, as shown in FIG. 3. Noncoincidence or nonuniformity between the optimum recording currents of the two recording layers 14 and 16 is caused by an increase in a recording current I which is proportional to an increase in the film thickness, as shown in FIG. 4. Therefore, when the two recording layers 14 and 16 of the disk 10 have different film thicknesses, the design of an electronic system using the disk 10 is difficult.

According to the embodiment of the present invention, noncoincidence between the characteristics of the reproduced output voltage vs. the optimum recording current of the recording layers 14 and 16 due to the difference in film thickness thereof can be compensated by properly varying coercive forces Hc1 and Hc2 (to be referred as to perpendicular coercive forces hereinafter) of the layers 14 and 16 which are perpendicular to the film surfaces thereof. In this embodiment, since the thickness t1 of the first recording layer 14 is set to be larger than the thickness t2 of the second recording layer 16, a reproduced output voltage Ep1 and an optimum recording current I1 of the first recording layer 14 are smaller than a reproduced output voltage Ep2 and an optimum recording current I2 of the second recording layer 16. For this reason, as described above, the perpendicular coercive force Hc1 of the first recording layer 14 was set to be lower than the coercive force Hc2 of the second recording layer 16.

FIG. 5 is a graph showing changes in a reproduced output voltage Ep when the film thickness t of the recording layer is fixed at a constant value and the perpendicular coercive force Hc of a material constituting the layer is varied. As is apparent from this graph, an increase in the perpendicular coercive force Hc of the recording layer directly attributes to an increase in the reproduced output voltage Ep.

Figure 6:
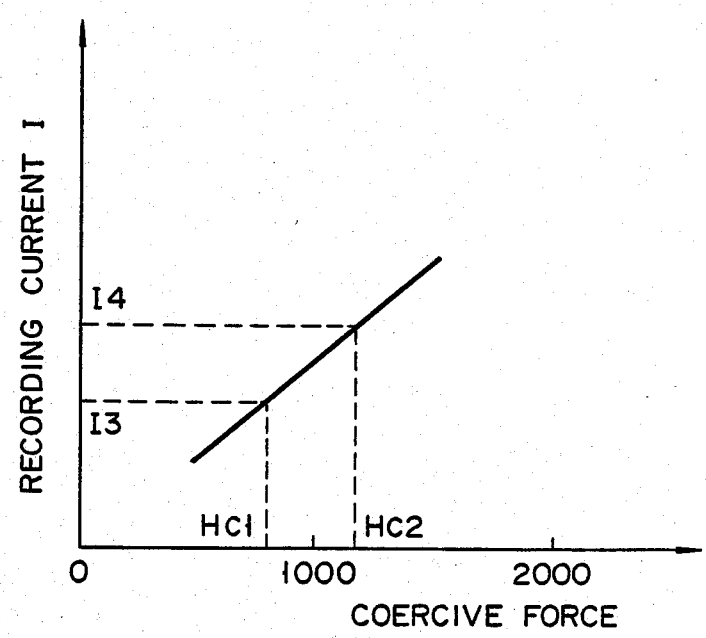

FIG. 6 is a graph showing changes in an optimal recording current I when the film thickness t of the recording layer is fixed at a constant value and the perpendicular coercive force Hc of the material constituting the layer is varied. As is apparent from this graph, an increase in the perpendicular coercive force of the recording layer directly causes an increase in the optimal recording current I thereof. It should be noted that in the graphs of FIGS. 5 and 6, the scale along the ordinate is not a logarithmic scale, but a normal scale.

To summarize the relationship between the above parameters (i.e., the thickness t and the coercive force Hc), according to the two-side recording type disk 10 for perpendicular magnetic recording of the present invention, (1) in order to prevent the curl phenomenon, the film thickness t1 of the first recording layer 14 is set to be larger than the film thickness t2 of the second recording layer 16, and (2) in order to compensate for the fact that the reproduced output voltage Ep1 and the optimum recording current I1 of the first layer 14 are larger than the reproduced output voltage Ep2 and the optimum recording current I2 of the second layer 16 due to the difference in the film thickness, the perpendicular coercive force Hc1 of the first layer 14 is set to be lower than the perpendicular coercive force Hc2 of the second layer 16. As a result, according to the present invention, the curl phenomenon in the manufacturing process can be suppressed or prevented, and simultaneously, the recording disk 10 which can perform double-sided perpendicular magnetic recording and has two recording layers 14 and 16 with equal reproduced output voltages Ep and the optimum recording currents I can be provided. This recording disk 10 allows proper design of an electronic system.

Although the present invention has been shown and described with reference to particular embodiments, various changes and modifications which are obvious to a person skilled in the art to which the invention pertains are deemed to lie within the scope of the invention.

For example, since the film thickness ratio between the first and second recording layers for suppressing the curl phenomenon differs in accordance with sputtering conditions and the like, it can be different from that in the above embodiment. In this embodiment, the recording layer is constituted by a Co-Cr film, but other alloys, e.g., Co-V, Co-W, Co-Re, Co-Ru, and the like can be used. Furthermore, the present invention can be applied to a magnetic recording medium having a soft magnetic layer below a magnetic recording layer consisting of a hard ferromagnetic material.

What is claimed is:

1. A disk-shaped magnetic recording medium which can record data on two surfaces thereof in accordance with a perpendicular magnetic recording technique, comprising:
    a flexible base layer; and
    two magnetic recording layers which sandwich said base layer therebetween, each of said magnetic layers having an axis of easy magnetization in a direction perpendicular to their respective surfaces which are formed to have different film thicknesses wherein the ratio of said thicknesses is set so as to prevent a curl phenomenon from occurring in said magnetic recording medium, wherein one of said recording layers has a larger film thickness and a lower coercive force than that of the other one of said recording layers to thereby compensate for a noncoincidence between magnetic characteristics of said magnetic recording layers due to said differences in film thicknesses.

2. The disk-shaped magnetic recording medium according to claim 1, wherein said first and second magnetic recording layers comprise alloy films containing metal cobalt.

3. A disk-shaped magnetic recording medium which can record data on two surfaces thereof in accordance with a perpendicular magnetic recording technique, comprising:
    a flexible base layer having first and second opposing surfaces;
    a first magnetic recording layer formed on the first surface of said base layer to have a first thickness and a first perpendicular coercive force; and
    a second magnetic recording layer formed on the second surface of said base layer to have a second thickness and a second perpendicular coercive force, said first thickness being larger than said second thickness so as to prevent the curl phenomenon from occurring in said magnetic recording medium, and said first perpendicular coercive force being lower than said second perpendicular coercive force so as to compensate for a noncoincidence between reproduced output voltages and a noncoincidence between optimum recording currents of said first and second recording layers due to the difference in thicknesses thereof.

* * * * *